(12) United States Patent
Borer et al.

(10) Patent No.: US 10,455,209 B2
(45) Date of Patent: Oct. 22, 2019

(54) METHOD AND APPARATUS FOR CONVERSION OF HDR SIGNALS

(71) Applicant: British Broadcasting Corporation, London (GB)

(72) Inventors: Timothy John Borer, Surrey (GB); Andrew David Raine Cotton, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 15/196,276

(22) Filed: Jun. 29, 2016

(65) Prior Publication Data

US 2017/0006273 A1 Jan. 5, 2017

(30) Foreign Application Priority Data

Jun. 30, 2015 (GB) .................................. 1511495.2

(51) Int. Cl.
*H04N 9/77* (2006.01)
*G09G 5/02* (2006.01)
(Continued)

(52) U.S. Cl.
CPC .............. *H04N 9/77* (2013.01); *G06T 5/009* (2013.01); *G09G 5/02* (2013.01); *H04N 5/202* (2013.01); *H04N 9/68* (2013.01); *G06T 2207/20208* (2013.01); *G09G 5/10* (2013.01); *G09G 2320/0276* (2013.01); *G09G 2340/06* (2013.01); *G09G 2360/16* (2013.01); *G09G 2370/04* (2013.01)

(58) Field of Classification Search
CPC .......... G06T 2207/20208; G06T 5/007; H04N 19/98; H04N 5/2355; H04N 1/60; H04N 1/6066; H04N 21/4854; H04N 7/0125; H04N 7/0117; H04N 9/646; H04N 9/77
See application file for complete search history.

(56) References Cited

U.S. PATENT DOCUMENTS

2005/0117799 A1 6/2005 Fuh et al.
2006/0214945 A1* 9/2006 Nitta .................... G09G 3/3406
345/603

(Continued)

FOREIGN PATENT DOCUMENTS

WO WO 2013/046095 A1 4/2013
WO WO 2015/007505 A1 1/2015

OTHER PUBLICATIONS

PCT Search Report of the ISA for PCT Appl. No. PCT/GB2016/051983 dated Sep. 26, 2016; 5 pages.
(Continued)

*Primary Examiner* — Michael E Teitelbaum
(74) *Attorney, Agent, or Firm* — Daly, Crowley, Mofford & Durkee LLP

(57) ABSTRACT

Described are concepts, systems and techniques related to processing an input video signal intended for a first display to produce an output signal appropriate for a second display. The concepts, systems and techniques include converting using one or more transfer functions arranged to provide relative scene light values and remove or apply rendering intent of the input or output video signal, wherein the removing or applying rendering intent alters luminance.

21 Claims, 6 Drawing Sheets

(51) Int. Cl.
*H04N 5/202* (2006.01)
*G06T 5/00* (2006.01)
*H04N 9/68* (2006.01)
*G09G 5/10* (2006.01)

(56) References Cited

U.S. PATENT DOCUMENTS

| | | | | |
|---|---|---|---|---|
| 2013/0076974 A1* | 3/2013 | Atkins | ................... | H04N 5/235 348/362 |
| 2014/0035944 A1* | 2/2014 | Kulkarni | ............... | G06T 11/001 345/604 |
| 2015/0358646 A1* | 12/2015 | Mertens | ............... | H04N 1/6058 382/166 |
| 2016/0165256 A1* | 6/2016 | Van Der Vleuten | ..... | H04N 9/68 375/240.01 |

OTHER PUBLICATIONS

PCT Written Opinion of the ISA for PCT Appl. No. PCT/GB2016/051983 dated Sep. 26, 2016; 7 pages.
UK Search Report for Appl. No. GB1511495.2 dated Dec. 16, 2015; 1 page.
Communication pursuant to Article 94(3) EPC from the EPO dated May 21, 2019 for Application No. 16736590.7; 8 Pages.
Cotton et al. "International Organisation for Standardisation Organisation Internationale De Normalisation", Jun. 2015, 22 pages.

* cited by examiner

METHOD AND APPARATUS FOR CONVERSION OF HDR SIGNALS

PRIORITY STATEMENT

This application claims priority under 35 U.S.C. § 119 to UK Application No. GB1511495.2 filed on Jun. 30, 2015, the contents of which are herein incorporated by reference in their entireties.

FIELD

The concepts described herein relate to processing a video signal from a source, to convert between a signal produced according to first rendering settings to a signal usable by a display of second rendering settings.

BACKGROUND

As is known in the art, high dynamic range (HDR) video is starting to become available. HDR video has a dynamic range, i.e. the ratio between the brightest and darkest parts of the image, of 10000:1 or more. Dynamic range is sometimes expressed as "stops" which is logarithm to the base 2 of the dynamic range. A dynamic range of 10000:1 therefore equates to 13.29 stops. The best modern cameras can capture a dynamic range of 13.5 stops and this is improving as technology develops.

Conventional televisions (and computer displays) have a restricted dynamic range of about 100:1. This is sometimes referred to as standard dynamic range (SDR).

HDR video provides a subjectively improved viewing experience. It is sometime described as an increased sense of "being there" or alternatively as providing a more "immersive" experience. For this reason many producers of video would like to produce HDR video rather than SDR video. Furthermore since the industry worldwide is moving to HDR video, productions are already being made with high dynamic range, so that they are more likely to retain their value in a future HDR world.

Various attempts have been made to convert between HDR video signals and signals usable by devices using lower dynamic ranges (for simplicity referred to as standard dynamic range (SDR)). One such approach is to modify an opto electronic transfer function (OETF).

FIG. 1 shows an example system in which a modified OETF may be used to attempt to provide such conversion. An OETF is a function defining conversion of a brightness value from a camera to a "voltage" signal value for subsequent processing. For many years, a power law with exponent 0.5 (i.e. square root) has ubiquitously been used in cameras to convert from luminance to voltage. This opto-electronic transfer function (OETF) is defined in standard ITU Recommendation BT.709 (hereafter "Rec 709") as:

$$V = \begin{cases} 4.5L & \text{for } 0 \le L < 0.018 \\ 1.099 L^{0.45} - 0.099 & \text{for } 0.018 \le L \le 1 \end{cases}$$

where:
L is luminance of the image $0 \le L \le 1$
V is the corresponding electrical signal Note that although the Rec 709 characteristic is defined in terms of the power 0.45, overall, including the linear potion of the characteristic, the characteristic is closely approximated by a pure power law with exponent 0.5.

Combined with a display gamma of 2.4 this gives an overall system gamma of 1.2. This deliberate overall system non-linearity is designed to compensate for the subjective effects of viewing pictures in a dark surround and at relatively low brightness. This compensation is sometimes known as "rendering intent". The power law of approximately 0.5 is specified in Rec 709 and the display gamma of 2.4 is specified in ITU Recommendation BT.1886 (hereafter Rec 1886). Whilst the above processing performs well in many systems improvements are desirable for signals with extended dynamic range.

The arrangement shown in FIG. 1 comprises an HDR OETF 10 arranged to convert linear light from a scene into RGB signals. This will typically be provided in a camera. The RGB signals may be converted to YCbCr signals in a converter 12 for transmission and then converted from YCbCr back to RGB at converters 14 and 16 at a receiver. The RGB signals may then be provided to either an HDR display or SDR display. If the receiver is an HDR display then it will display the full dynamic range of the signal using the HDR EOTF 18 to accurately represent the original signal created by the HDR OETF. However, if the SDR display is used, the EOTF 20 within that display is unable to present the full dynamic range and so will necessarily provide some approximation to the appropriate luminance level for the upper luminance values of the signal. The way in which a standard dynamic range display approximates an HDR signal depends upon the relationship between the HDR OETF used at the transmitter side and the standard dynamic range EOTF used at the receiver side.

FIG. 2 shows various modifications to OETFs including the OETF of Rec 709 for comparison. These include a known "knee" arrangement favoured by camera makers who modify the OETF by adding a third section near white, by using a "knee", to increase dynamic range and avoid clipping the signal. Also shown is a known "perceptual quantizer" arrangement. Lastly, a proposed arrangement using a curve that includes a power law portion and a log law portion is also shown. The way in which an SDR display using the matched Rec 1886 EOTF represents images produced using one of the HDR OETF depends upon the OETF selected. In the example of the Knee function, the OETF is exactly the same as the Rec 709 for most of the curve and any departs therefrom for upper luminance values. The effect for upper luminance values at an SDR receiver will be some inaccuracy.

The above described conversions consider the ability to present an HDR signal on an SDR display.

However, these conversions do not consider a further need to convert signals produced for one display such that they may be appropriately presented on a different display. Such a conversion may be needed, we have appreciated, even between HDR signals produced for one display so that they are usable on a different display. Conversions for providing appropriate rendering on different displays will depend upon the way in which a signal was produced and the way a target display renders the signal.

SUMMARY

We have appreciated that conversion between a video signal appropriate for one display and a video signal intended for a different display requires a process that accounts for different rendering intents. We have further appreciated that such a process should avoid altering colours, that is hue and saturation.

The concepts sought to be protected herein are defined in the claims to which reference is directed.

In broad terms, the concepts, systems and techniques are directed toward a system and a method of processing an input video signal intended for a first display to produce an output signal appropriate for a second display, comprising converting using one or more transfer functions arranged to provide relative scene light values; and remove or apply rendering intent of the input or output video signal, wherein the removing or applying rendering intent alters luminance.

BRIEF DESCRIPTION OF THE DRAWINGS

The concepts, systems and techniques will be described in more detail by way of example with reference to the accompanying drawings, in which.

DESCRIPTION OF A PREFERRED EMBODIMENT OF THE INVENTION

Figure 1:
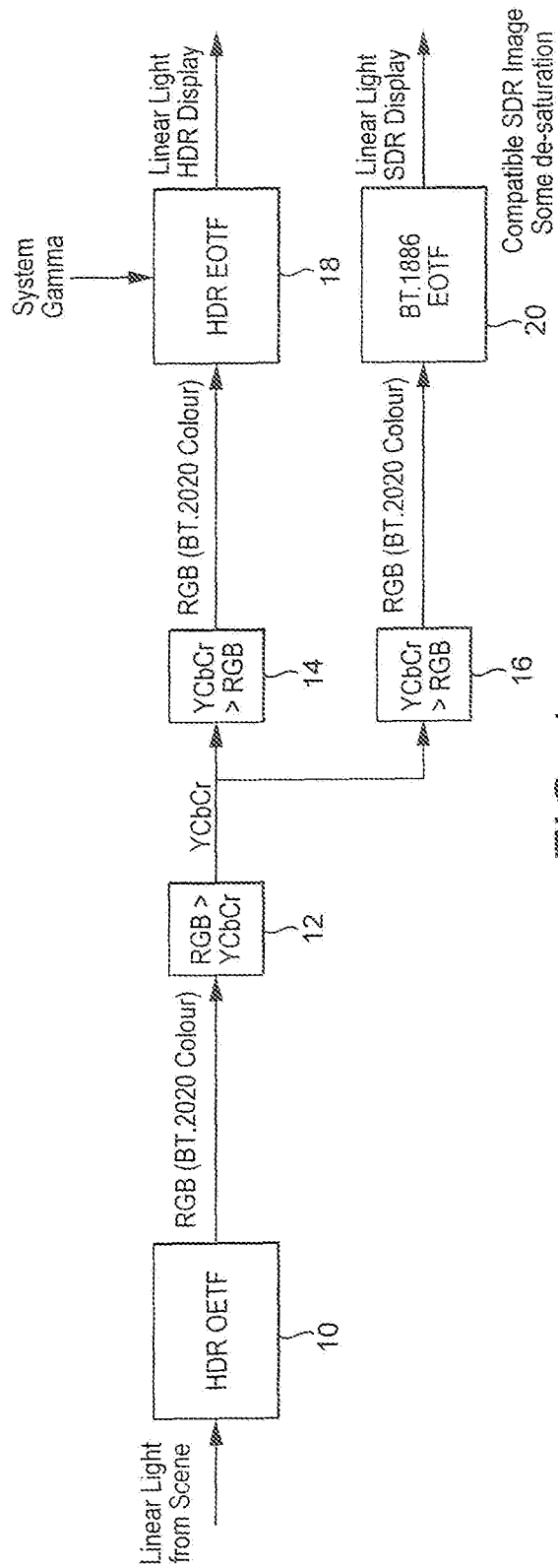
FIG. 1 is a diagram of an arrangement in which a modified OETF may be used to modify an HDR signal for use with SDR target equipment.
Figure 2:
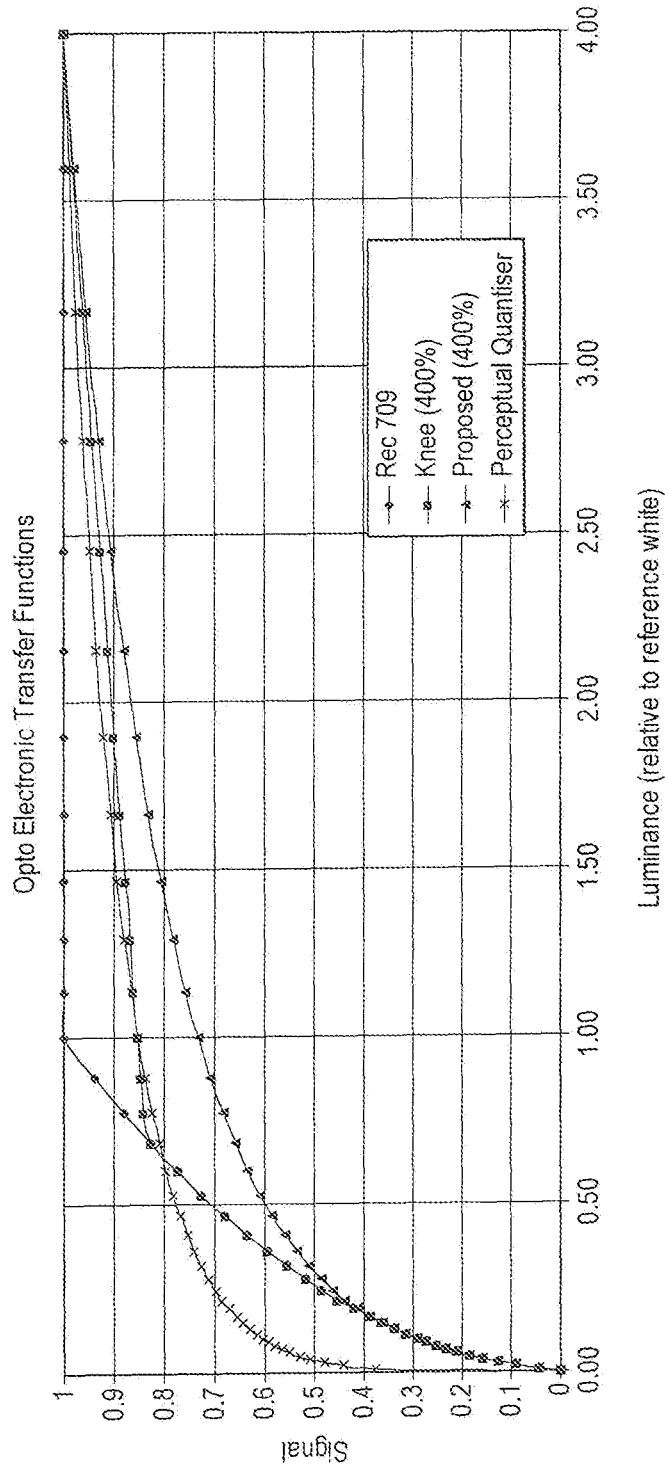
FIG. 2 is a graph showing a comparison of opto-electronic transfer functions.

The concepts sought to be protected may be embodied in a method of processing video signals to convert between video signals appropriate for one display and signals appropriate for a target display, devices for performing such conversion, transmitters, receivers and systems involving such conversion.

An embodiment will be described in relation to processing which may be embodied in a component within a broadcast chain. The component may be referred to as a converter for ease of discussion, but it is to be understood as a functional module that may be implemented in hardware or software within another device or as a standalone component. The converter may be within production equipment, a transmitter or a receiver, or within a display. The functions may be implemented as a 3D look up table. Some background relating to video signals will be presented first for ease of reference.

Scene Referred & Display Referred Signals

High dynamic range (HDR) television offers the potential for delivering much greater impact than conventional, or "standard", dynamic range (SDR) television. Standards for HDR television signals are needed to support the development and interoperability of the equipment and infrastructure needed to produce and deliver HDR TV. Two different approaches to HDR signal standardisation are emerging. These may be referred to as "scene referred" and "display referred" and are described below. It is likely that movies and videos will be produced using both types of signal. We have appreciated the need to interconvert between signals such as these two types of signal. This disclosure describes how to perform such conversions whilst maintaining the image quality and artistic intent embodied in the signals. Furthermore, with one type of signal ("display referred"), processing is also required to convert between signals intended to be shown on displays with different brightnesses. This disclosure also describes now to perform inter-conversions between different "display referred" signals. The main embodiment described is for HDR signals but the techniques described also apply to other signals representing moving images.

A "scene referred" signal represents the relative luminance that would be captured by a camera, that is the light from a scene. Such signals typically encode dimensionless (i.e. normalised) values in the range zero to one, where zero represents black and one represents the brightest signal that can be detected without the camera sensor saturating. This type of signal is used in conventional television signals, for example as specified in international standard ITU-R BT 709. Such signals may be presented on displays with different peak luminance. For example the same signal may be shown on a professional display (used in programme production) with a peak luminance of 100 cd/m$^2$ or a consumer TV with a peak luminance of 400 cd/m$^2$ viewed in a home. This is supported by international standard ITU-R BT 1886. It defines an electro-optic transfer function (EOTF), which specifies how the signal is converted to light emitted (or reflected) from a display (or screen). In ITU-R BT 1886 the EOTF is parameterised by the peak luminance (and black level) of the display, thereby allowing image presentation on displays of different brightness. The signal from scanning conventional photo-chemical film stock, or from an electronic "film camera" also represents light from a scene and so is "scene referred". Recently a "scene referred" HDR TV signal was proposed in BBC Research & Development White Paper WHP283. Similar signals have been proposed to the International Telecommunications Union (ITU) for standardisation. In summary, a 'scene referred' signal provides relative luminance and so is dimensionless and represents the light captured by the image sensor in a camera.

A different type of moving image signal, known as "display referred", was defined for HDR movies, in SMPTE standard ST 2084 in 2014, and has also been proposed to the ITU for standardisation. This signal represents the light emitted from a display. Therefore this signal represents an absolute luminance level. For example the luminance of a pixel at a specified location on the display may be coded as 2000 cd/m$^2$. In ST 2084 the signal range is zero to 10000 cd/m$^2$. Note that in a display referred signal the values have dimension cd/m$^2$ (or equivalent), whereas in a "scene referred" signal the values are relative and, therefore, dimensionless.

We have appreciated that the absolute, rather than relative nature of display referred signals presents a difficulty if the signal value is brighter than the peak luminance of a display. For example consider a signal prepared or "graded" on a display with a peak luminance of 4000 cd/m$^2$. This signal is likely to contain values close to the peak luminance of the display, 4000 cd/m$^2$. If you now try to display such a signal on a display capable of only 48 cd/m$^2$ (which is the brightness of a projected cinema image), we have appreciated the problem of displaying pixels that are supposed to be shown brighter than the display can manage.

One way that has been used hitherto is to show pixels too bright for the display at its peak luminance. This is known as "limiting" or "clipping". However, in this example, the specified luminance of many pixels will be greater than the capabilities of the cinema projector, resulting in large regions in which the image is severely distorted. Clearly clipping is not always a satisfactory method of presenting a display referred signal. This disclosure describes how to convert a display referred signal intended for display at a given brightness to be displayed at a different brightness, whilst preserving image quality and artistic intent.

A key feature of moving image displays is "rendering intent". The need for rendering intent is to ensure the subjective appearance of pictures is close to the appearance of the real scene. Naively one might think that the luminance of an image should be a scaled version of that captured by the camera. For printed photographic images this is approximately correct; "over most of the density range, the points lie near the straight line of unity gamma [described later] passing through the origin" (Hunt, R. W. G., 2005. The Reproduction of Colour. ISBN 9780470024263, p55). But for images displayed in dark surroundings (e.g. projected transparencies, movies, or television) it has long been known that an overall non-linearity between camera and display is required to produce subjectively acceptable pictures (see Hunt ibid, or Poynton, C. & Funt, B., 2014. Perceptual uniformity in digital image representation and display. Color Res. Appl., 39: 6-15). Rendering intent is, therefore, the overall non-linearity applied between camera and display so that the subjective appearance of the image best matches the real scene.

Rendering intent is typically implemented using "gamma curves", or approximations thereto, in both the camera and the display. A gamma curve is simply a power law relationship between the signal values and luminance. In the camera the relationship between the relative light intensity, $L_c$ (range [0:1]), detected by the camera, and values encoded in the signal, V (range [0:1]), may be approximated by:

$$V = L_c^{\gamma_c}$$

Similarly, in the display, the relationship between emitted light, $L_d$ (range [0:1]), normalised to the peak display brightness), and the signal value V may be approximated by:

$$L_d = V^{\gamma_d}$$

Therefore:

$$L_d = L_c^{\gamma_c \gamma_d}$$

Figure 3:
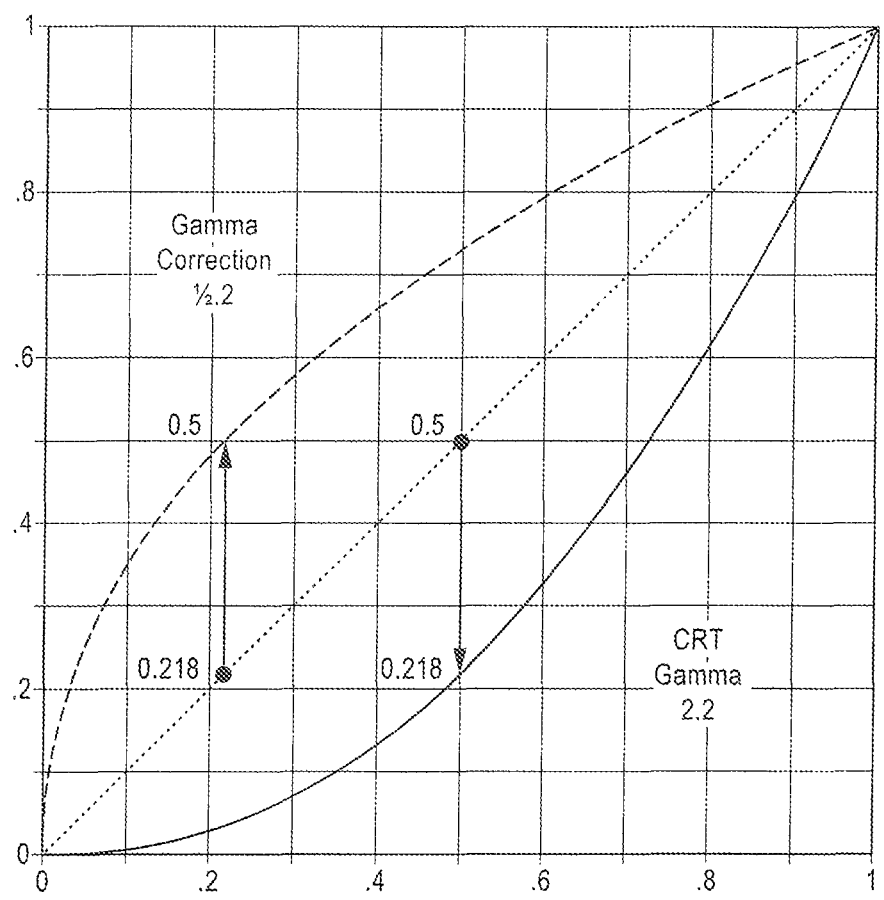
FIG. 3 illustrates a gamma curve for a conventional CRT display.

FIG. 3 illustrates a CRT display gamma of 2.2 and complementary "gamma correction" applied in the camera (that is, another gamma curve with an inverse value of gamma), which together implement a linear system overall.

If $\gamma_d = 1/\gamma_c$ then, overall, the camera/display system is linear, but this is seldom the case in practice. More generally overall, end to end, "system gamma" is given by the product of $\gamma_c$ and $\gamma_d$.

Different rendering intents are used for different forms of image reproduction. Projected photographic transparencies use a system gamma of about 1.5. Movies typically apply a system gamma of about 1.56. Reference monitors, used in television production, apply a system gamma of about 1.2. The system gamma used depends primarily on the brightness of the display and the background luminance surrounding the display. Experimentally we have found that the system gamma providing the best subjective picture rendition may be approximated by:

$$\gamma \approx 1 + \frac{1}{5}\log_{10}\left(\frac{L_{peak}}{L_{surround}}\right)$$

where $L_{peak}$ is the peak luminance of the picture, and $L_{surround}$ is the luminance surrounding the display. In any given viewing environment a more precise value of system gamma may be determined experimentally. Using such "custom" values of system gamma, rather than the approximate generic formula above, may improve the fidelity of the image conversion described below.

Gamma curves have been found empirically to provide a rendering intent that subjectively yields high quality images. Nevertheless other similar shaped curves might yield improved subjective quality. The techniques disclosed herein are described in terms of gamma curves. But the same techniques may be applied with curves with a different shape.

Colour images consist of three separate colour components, red, green and blue, which affects how rendering intent should be applied. We have appreciated that applying a gamma curve to each component separately distorts the colour. It particularly distorts saturation but also, to a lesser extent, the hue. For example, suppose the red, green and blue components of a pixel have (normalised) values of (0.25, 0.75, 0.25). Now if we apply a gamma of 2, i.e. square the component values, we get (0.0625, 0.5625, 0.0625). We may note two results: the pixel has got slightly darker, and the ratio of green to blue and red has increased (from 3:1 to 9:1), which means that a green pixel has got even greener. In general we would not wish to distort colours when displaying them, so this approach is not ideal.

Rather than applying a gamma curve independently to each colour component we have appreciated we may apply it to only to the luminance (loosely the "brightness"). The luminance of a pixel is given by a weighted sum of the colour components; the weights depend on the colour primaries and the white point. For example with HDTV, specified in ITU-R BT 709, luminance is given by:

$$Y = 0.2126\,R + 0.7152\,G + 0.0722\,B$$

or, for the newer UHDTV, specified in ITU-R BT 2020, luminance is given by:

$$Y = 0.2627\,R + 0.6780\,G + 0.0593\,B$$

where Y represents luminance and R, G and B represent the normalised, linear (i.e. without applying gamma correction), colour components.

By applying a gamma curve, or rendering intent, to the luminance component only we can avoid colour changes in the display.

Image Signal Chain

Figure 4:
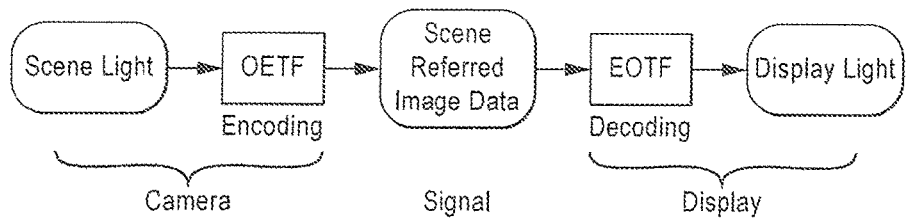
FIG. 4 shows a conventional signal chain from camera to display showing the main transfer functions.

FIG. 4 shows a known scene referred signal chain. FIG. 4 shows processing steps in the signal chain but may equally be considered a block diagram of the functional components. In particular, the rectangular boxes in FIG. 4 may be considered as processing steps or as processors programmed to perform a function or as dedicated hardware arranged to perform that function. The rounded boxes describe the meaning of the signals in the processing chain. The same applies to the embodiments shown in FIGS. 5 to 9.

As shown in FIG. 4 the (normalised) light signal from the scene is first captured by a camera (physical or virtual). It is then "encoded" by applying a non-linear, opto-electric transfer function (OETF), which is typically an approximation to a gamma curve for SDR TV. The signal, representing scene referred image data, may then be combined and processed to produce a television programme or movie. To view the finished programme a second non-linearity, the electro-optical transfer function (EOTF), "decodes" the signal to generate the light presented on the display. The EOTF combines two functions, first it inverts the OETF to regenerate the linear light signal captured by the camera. It then applies rendering intent so that the displayed image looks subjectively correct. The combination of the OETF and the EOTF, applied in sequence, is the rendering intent and is also known as the opto-optical transfer function (OOTF).

Conventionally the OETF is applied independently to the three colour components (although in principle it could be, non-separable, a joint function of them). This allows it to be implemented very simply using three independent 1 dimensional lookup tables (1D LUTs). Similarly the EOFT has also, conventionally, been implemented independently on the three colour components. Typically the EOTF is implemented using three non-linear digital to analogue converters (DACs) immediately prior to the display panel, which is equivalent to using independent 1D LUTs. However, as discussed above, this leads to colour changes. So, ideally, the EOTF would be implemented as a combined function of the three colour components. This is a little more complex that using 1D LUTs but could be implemented in a three dimensional look up table (3D LUT).

Only two of the OETF, the EOTF and the OOTF are independent. In functional notation:

$$OOTF_R(R, G, B) = EOTF_R(OETF_R(R, G, B))$$

$$OOTF_G(R, G, B) = EOTF_G(OETF_G(R, G, B))$$

$$OOTF_B(R, G, B) = EOTF_B(OETF_B(R, G, B))$$

This is easier to see if we use the symbol $\otimes$ to represent concatenation. With this notation we get the follow three relationships between these three non-linearities:

$$OOTF = OETF \otimes EOTF$$

$$EOTF = OETF^{-1} \otimes OOTF$$

$$OETF = OOTF \otimes EOTF^{-1}$$

The display referred signal chain looks superficially similar (and so is not illustrated) but the signal corresponds to display referred image data. A crucial difference is that the EOTF is fixed and does not vary with display brightness, display black level or the viewing environment (particularly the luminance surrounding the display). Rendering intent, or OOTF, must vary with display characteristics and viewing environment to produce a subjectively acceptable picture. Therefore, for a display referred signal, the OOTF, and hence the EOTF, must depend on the specific display on which the signal is to be presented and its viewing environment. For fixed viewing environment, such as viewing movies in a cinema, this is possible. For television, where the display and viewing environment are not known when the programme is produced, this is not practical. In practice display referred signals are intended for producing non-live programmes. The OETF is largely irrelevant as the image is adjusted by an operator until it looks right on the "mastering" display.

Conversion from Scene Referred Signals to Display Referred Signals

Figure 5:
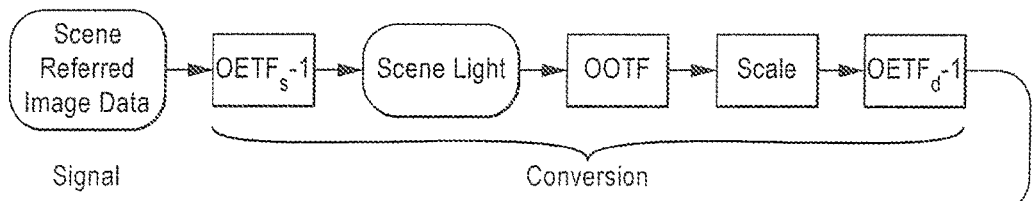
FIG. 5 shows a first embodiment involving conversion from scene referred signals to display referred signals.
Figures 6, 7:
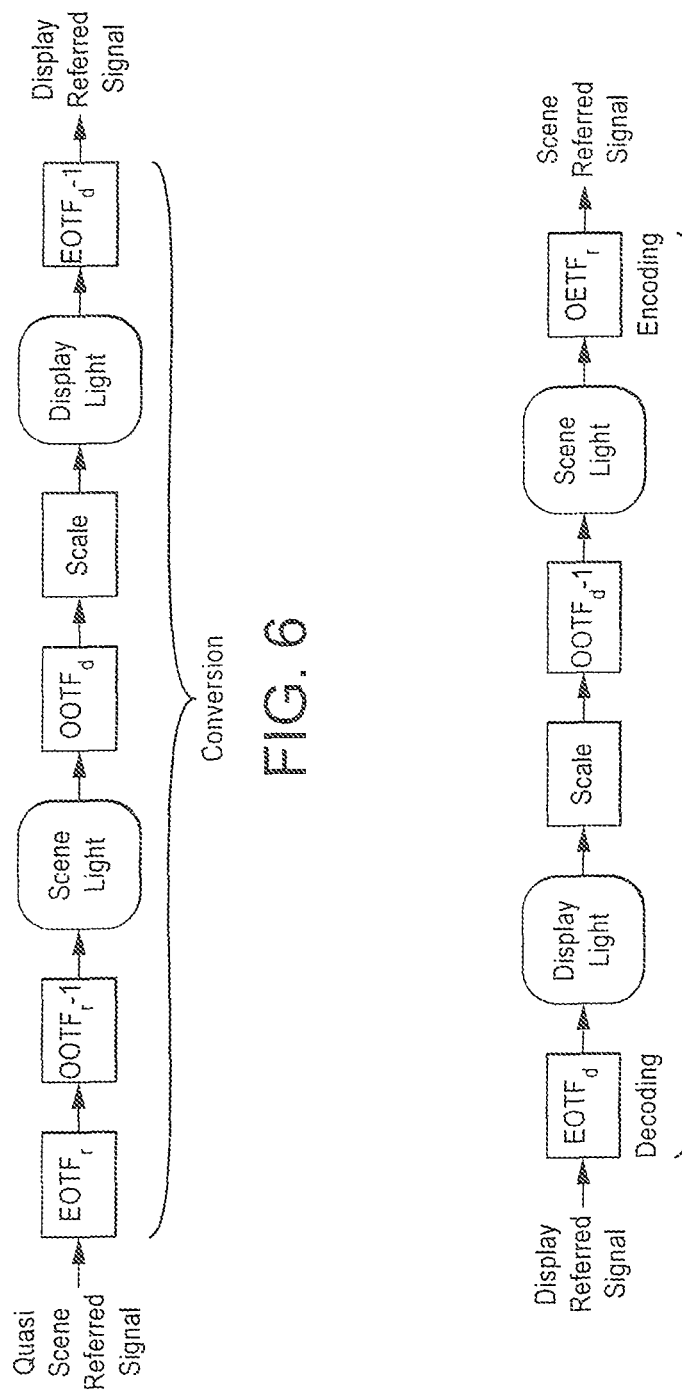
FIG. 6 shows a variation of the conversion of FIG. 5 in which the scene referred signals include some rendering intent.
FIG. 7 shows a second embodiment providing conversion of display referred signals to scene referred signals.
Figure 8:
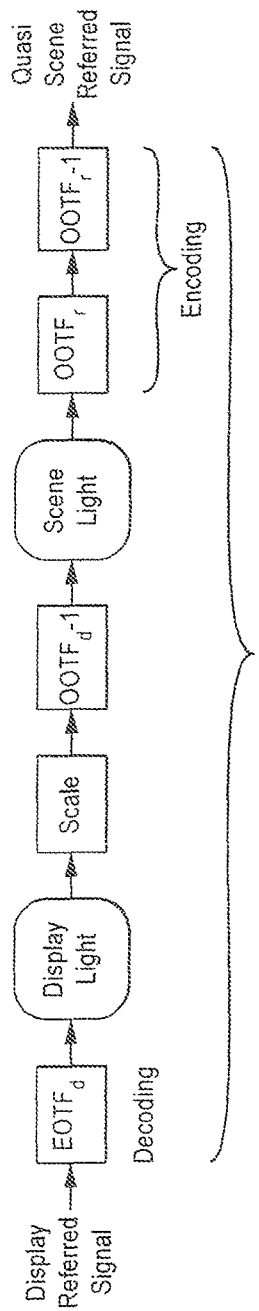
FIG. 8 shows a variation of the embodiment of FIG. 7 in which the scene referred signals include some rendering intent.

FIG. 5 shows a first embodiment providing conversion from a scene referred signal to a display referred signal. As a reminder, a scene referred signal is one in which luminance values are relative and therefore dimensionless. Accordingly, in order to present such a signal on a display expecting a display referred signal using absolute values, a conversion is needed. The received display independent signal does not depend on a defined display and so could equally well be rendered to any display. Such signals include, for example, proprietary camera manufacturers' signals such as Sony's S-Log, Panasonic's Panalog and Arri's Log C. In a first step an inverse opto-electric transfer function is used to reverse the effect of the OETF ordinarily used to produce the scene referred signal. The output of this processing step is a scene light signal. Importantly, and not seen in prior arrangements, an opto-optical transfer function OOTF is applied in the conversion chain. The OOTF used appropriately in the processing chain ensures that the rendering intent of the target display is properly considered in the conversion. This applies to the embodiments of FIGS. 5 and 6. In the embodiments of FIGS. 7 and 8 an inverse OOTF is used to properly take account of the rendering intent in the received signal.

Thus $OETF_s^{-1}$ is the inverse OETF for the scene referred signal, OOTF is the desired rendering intent, discussed in more detail below, and $EOTF_d^{-1}$ is the inverse of the display EOTF.

The design of the OOTF is described using gamma curves, but a similar procedure may be used for an alternative psycho-visual curve to a gamma curve. The $OETF_s^{-1}$ regenerates the linear light from the scene detected by the camera. Form this we may calculate the (normalised) scene luminance Ys, for example for UHDTV, $$Y_s = 0.2627 R_s + 0.6780 G_s + 0.0593 B_s$$

where the subscript s denotes values relating to the scene. We apply rendering intent to the scene luminance, for example using a gamma curve:

$$Y_s = Y_s^\gamma$$

Here the appropriate gamma may be calculated using the approximate generic formula above, or otherwise. In calculating gamma we need to choose an intended peak image brightness, $L_{peak}$, and the luminance surrounding the display, $L_{surround}$. The surrounding luminance may be measured by sensors in the display or otherwise. Alternatively it may be estimated based on the expected, or standardised ("reference"), viewing environment. Once we know the displayed luminance we may calculate the red, green, and blue components to be presented on the display to implement the OOTF directly on each RGB component (Equation 1)

$$R_d = L_{peak} \times R_s \times (Y_d/Y_s)$$

$$G_d = L_{peak} \times G_s \times (Y_d/Y_s)$$

$$B_d = L_{peak} \times B_s \times (Y_d/Y_s)$$

where subscript d denotes values relating to the display. As noted above the scene referred data is dimensionless and normalised to the range [0:1], whereas display referred data has dimensions cd/m². To convert to display referred values they should be multiplied ("scaled") by the chosen peak image brightness, $L_{peak}$. Finally the linear light values calculated this way should be "encoded" using the inverse of the display referred EOTF, $EOTF_d^{-1}$.

The conversion may be implemented in a variety of ways. The individual components may be implemented using lookup tables and the scaling as an arithmetic multiplier. The OETF and EOTF may be implemented using 1D LUTs, but the OOTF requires a 3D LUT. Alternatively the conversion may conveniently be implemented using a single 3D LUT that combines all separate components.

As a summary of the above, the embodiment applies an opto-optical transfer function (OOTF) as a step in the processing chain to appropriately provide the rendering intent of the target display. In addition, a scaling step is provided to convert between normalised values and absolute values. A particular feature of the embodiment is that the OOTF does not alter colour, more specifically it does not alter hue or saturation, and this can be achieved either by conversion of signals from RGB to a separate luminance component against which gamma is then provided. Preferably, the OOTF is provided directly on the RGB components in such a way that the relative values of the RGB components do not change such that colour is not altered. In effect, this applies the OOTF directly to RGB components so as to alter the overall luminance, but not the colour.

FIG. 6 shows a variation of conversion from scene referred signals to display referred signals in which the scene referred signal has some rendering intent inherent in the signal, in spite of having relative values, rather than absolute values.

Some signals have characteristics of both scene referred and display referred signals. This document refers to such signals as "quasi" scene referred signals. These include conventional SDR signals. For such signals an alternative method of conversion may yield higher quality results.

For conventional SDR signals the rendering intent is standardised and does not vary with display brightness. This implies the signal has some dependence on the display brightness and viewing environment. The rendering intent will be appropriate provided the peak display luminance is constant relative to the surrounding luminance and there is some degree of latitude in this ratio. In practice, for SDR signals, the conditions for the rendering intent to be substantially correct are usually met even though the brightness of displays can vary substantially.

When the highest quality conversion from a quasi-scene referred signal to a display referred signal is required it may be preferable to derive the linear scene light from the light intended to be shown on a "reference" display. This would take into account the rendering intent applied to the scene referred signal. Such an approach may also be beneficial for some HDR scene referred signals, such as proposed in BBC White Paper 283, which have similar characteristics to conventional SDR signals.

The difference in the conversion technique, shown in FIG. 6, is only in how linear scene light is derived from the input signal. As before, the rectangles show processing steps, whilst the rounded boxes describe the meaning of the values within the processing chain. "Scene Light" signal is a (normalised) linear light signal that would be captured by a camera, and "Display Light" is the linear light intensity values intended to be presented on the display.

Here the rendering intents, or OOTFs, are distinguished by subscripts. Subscript "d" indicates an OOTF used to create the display referred signal. Subscript "r" indicates the reference OOTF. That is the OOTF that would be used if the signal were to be rendered onto a "reference" display. $OOTF_r^{-1}$ represents the inverse of the reference $OOTF_r$, that is it "undoes" $OOTF_r$.

The first functional block in the processing chain, $EOTF_r$, applies the non-linearity specified for a reference monitor (display). This generates the linear light components that would be presented on a reference monitor. That is:

$$R_r = EOTF_r(R'_s)$$

$$G_r = EOTF_r(G'_s)$$

$$B_r = EOTF_r(B'_s)$$

where $R_r$, $G_r$, and $B_r$ are the linear light components on a (virtual) reference monitor. $R_s'$, $G_s'$, and $B_s'$ are the, non-linear (gamma corrected) quasi scene referred signals. Note that all signals are normalised to the range [0:1]. Note also that these equations assume the EOTF is applied independently to all colour components (e.g. implemented with a 1D LUT), which is usually the case but is not necessary to perform the conversion. Consider, for example a UHD television signals for which the EOTF is (presumably) specified by ITU-R BT 1886, which may be approximated by a gamma curve with an exponent of 2.4. In this example, $EOTF_r(x) = x^{2.4}$, so that:

$$R_r = R'^{2.4}_s$$

$$G_r = G'^{2.4}_s$$

$$B_r = B'^{2.4}_s$$

Once the linear light components are known we may the calculate reference luminance, $Y_r$, as indicated above.

In order to undo the implied system gamma (that is implement $OOTF_r^{-1}$) we first consider that:

$$R_r = R_s \times (Y_r/Y_s)$$

$$G_r = G_s \times (Y_r/Y_s)$$

$$B_r = B_s \times (Y_r/Y_s)$$

where $R_s$, $G_s$, $B_s$ and $Y_s$ are the linear light components of the scene (which are what we are after). Assuming the rendering intent is a gamma curve (and assuming a zero black offset) then we have $$Y_s = Y_r^{1/\gamma}$$

This implies an implementation of the inverse OOTF is (Equation 2):

$$R_s = R_r \times (Y_r)^{\frac{1-\gamma}{\gamma}}$$

$$G_s = G_r \times (Y_r)^{\frac{1-\gamma}{\gamma}}$$

$$B_s = B_r \times (Y_r)^{\frac{1-\gamma}{\gamma}}$$

With UHDTV, for example, which is standard dynamic range (SDR), we know that system gamma is 1.2 (see, for example, EBU-TECH 3321, EBU guidelines for Consumer Flat Panel Displays (FPDs), Annex A, 2007).

So we now have explicit values for the linear light components corresponding to the scene ("Scene Light"). These may be used, as they were in relation to conversion from scene referred to display referred, to generate a display referred signal.

Conversion from Display Referred Signals to Scene Referred Signals

FIG. 7 shows conversion from display referred signals to scene referred signals. This would commonly, but not exclusively, occur when converting a signal intended for display in the fixed viewing environment of a cinema to a format intended for television, without a fixed viewing environment.

Here the linear light intended to be presented on a display, "Display Light" is first generated using the display $EOTF_d$. This generates values with units of cd/m². The display light is divided by the peak value of display light to produce a dimensionless normalised value. Then the rendering intent ($OOTF_d$), that was applied to ensure the pictures looked subjectively correct, is undone by applying the inverse of the rendering intent ($OOTF_d^{-1}$). This generates a normalised signal representing the (linear) light that would have been detected by a camera viewing the real scene ("Scene Light"). Finally the linear scene light is encoded using the $OETF_r$ of the scene referred signal.

The peak value of display light may either be provided as an input to the conversion process, or it may be determined by analysing the signal itself. Because the peak value to be displayed may change from frame to frame it is more difficult to estimate the peak value of a live picture sequence (e.g. from a live sporting event) when the complete signal is not, yet, available. Note that when converting from a scene referred signal to a display referred signal the peak signal value must be chosen. In this reverse case, converting from a display referred signal to a scene referred signal, this same piece of information, peak signal value, must be provided or estimated.

Inverting the $OOTF_d$ is the same process as is used in inverting the OOTF, when converting quasi scene referred signals to display referred signals, above.

FIG. 8 shows a variation of conversion from display referred signals to scene referred signals. Sometimes it may be desirable to convert a display referred signal to a quasi scene referred signal, such as described in BBC White Paper 283.

In this conversion the processing in the signal chain prior to "Scene light" is the same as in method two, but the encoding of the "Scene light" to generate the quasi scene referred signal is different. To encode "Scene Light" we first apply the reference $OOTF_r$. This may be to apply a gamma curve to the luminance component of the linear scene light $Y_s$, that is:

$$Y_r = Y_s^\gamma$$

The individual colour components are then given by (Equation 3);

$$R_r = R_s \times (Y_r/Y_s) = R_s \times Y_s^{\gamma-1}$$

$$G_r = G_s \times (Y_r/Y_s) = G_s \times Y_s^{\gamma-1}$$

$$B_r = B_s \times (Y_r/Y_s) = B_s \times Y_s^{\gamma-1}$$

"scene light" encoding is completed by applying the reference $EOTF_r$ (e.g. ITU-R BT 1886).

Conversion Between different Display Referred Signals

Figure 9:
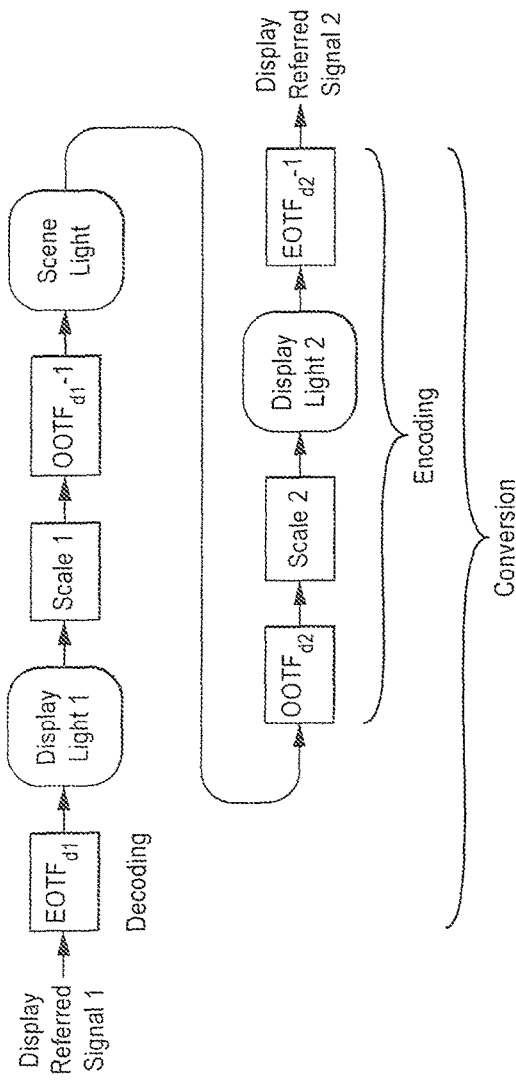
FIG. 9 shows a third embodiment involving conversion between different display referred signals.

FIG. 9 shows conversion from one display referred signal (for one target display) to another display referred signal (for a different display).

Display referred signals differ in the peak level of signal they hold. Each signal relates to a specific display (hence "display referred"). The signal is incomplete without knowledge of the display, especially its peak level and the luminance level surrounding the display (because these values determine how the pictures should be rendered to achieve high subjective quality). This data may be conveyed with the signal as metadata, or the peak signal level may be measured, or estimated, from the signal itself, and the surrounding luminance measured, or inferred from standards documents or from knowledge of current production practice. SMPTE ST 2084 provides two "Reference Viewing Environments" in Annex B, for HDTV and Digital Cinema. The HDTV environment has "a luminance of background of 8 to 12 cd/m2". The Digital Cinema environment only states the light level reflected from the screen and does not, directly, indicate the background illumination, which must be estimated.

A display referred signal may therefore be considered a "container" for signals produced (or "mastered") on displays with different brightness and viewing environments.

Since different display referred signals may relate to different "mastering" displays there is a need to convert between them. Furthermore such conversion implicitly indicates how a signal, mastered at one peak brightness and surrounding illumination, maybe reproduced at a different peak brightness and surrounding illumination. So this technique, for converting between display referred signals, may also be used to render a signal intended for one display, on a different display, in high quality. For example a programme or movie may be mastered on a bright display supporting peak luminance of 4000 $cd/m^2$(e.g. a Dolby "Pulsar" display), but may wish to be shown on a dimmer monitor, e.g. an OLED display (perhaps 1000 $cd/m^2$) or a cinema display (48 $cd/m^2$). Prior to this disclosure no satisfactory automatic (algorithmic) method had been suggested to achieve this conversion/rendering. Instead the proponents of SMPTE ST 2084 suggest that the programme or movie be manually re-graded (i.e. adjusted) to provide a satisfactory subjective experience. Clearly an automatic method for performing this conversion potentially provides significant benefits in terms of both cost and simplified production workflows.

This conversion may be implemented by concatenating the processing before "Scene Light" of the conversion from display referred to scene referred described above (i.e. a first $EOTF_{d1}$, cascaded with a first scaling factor and an inverse first $OOTF_{d1}^{-1}$), with the processing after "Scene Light" of the conversion from scene referred to display referred (i.e. a second $OOTF_{d2}$, cascaded with a second scaling factor and an inverse second $EOTF_{d2}^{-1}$). Note that the peak signal value for display referred signal 1 is needed to normalise the signal ("Scale 1"). It is also needed, along with the background illumination for to calculate $OOTF_{d1}$, which may be a gamma curve with gamma determined as above. Note that the peak signal value and background illumination are also needed for display 2. Peak signal 2 is used to multiply ("scale 2") the normalised signal to produce an absolute (linear) signal with the correct magnitude and dimensions $cd/m^2$ (and with background illumination to calculate a second value of gamma). By appropriate selection of these peak signal values and background illuminations the signal can be converted between different display referred signals or rendered for display on a display other than that used for production ("mastering").

Conversion between Scene Referred Signals and Quasi Scene Referred Signals

For completeness, we will describe conversion between scene referred signals and quasi scene referred signals. Whilst these are not the main embodiments, similar steps are performed.

10

The sections above consider 3 types of signal: a scene referred signal (e.g. a proprietary camera response curve such as Sony S-Log), a quasi scene referred signal (e.g. ITU-R BT 709, which uses ITU-R BT 1886 as a reference EOTF), or a display referred signal (e.g. SMPTE ST 2084). With three types of signal 9 types of conversion are possible and only 4 conversions are described above. The remaining conversions are between scene referred signals and quasi scene referred signals, which may also be useful. These conversions may be implemented by permuting the processing before and after "Scene Light" in methods above.

Conversion from a scene referred signal to a quasi-scene referred signal: This conversion may be implemented by concatenating the processing before "Scene Light" in FIG. 5 (i.e. $\text{OETF}_s^{-1}$), with the processing after "Scene Light" in FIG. 8 (i.e. $\text{OOTF}_r$ cascaded with $\text{EOTF}_r^{-1}$).

Conversion from a quasi scene referred signal to a scene referred signal: This conversion may be implemented by concatenating the processing before "Scene Light" in FIG. 6 (i.e. $\text{EOTF}_r$ cascaded with $\text{OOTF}_r^{-1}$), with the processing after "Scene Light" in FIG. 7 (i.e. $\text{OETF}_s$).

Conversion from a quasi scene referred signal to a different quasi-scene referred signal: This conversion may be implemented by concatenating the processing before "Scene Light" in FIG. 6 (i.e. a first $\text{EOTF}_r$ cascaded with a first $\text{OOTF}_r^{-1}$), with the processing after "Scene Light" in FIG. 8 (i.e. a second $\text{OOTF}_r$ cascaded with a second $\text{EOTF}_r^{-1}$).

Conversion from a scene referred signal to a different scene referred signal: This conversion may be implemented by concatenating the processing before "Scene Light" in FIG. 5 (i.e. a first $\text{OETF}_s^{-1}$), with the processing after "Scene Light" in FIG. 7 (i.e. a second $\text{OETF}_s$). This conversion technique is well known in the current art.

Accordingly, the concepts described herein should not be limited to disclosed embodiments but rather should be limited only by the spirit and scope of the appended claims. All publications and references cited herein are expressly incorporated herein by reference in their entirety.

The invention claimed is:

1. A method of processing an input video signal intended for a first display to produce an output video signal appropriate for a second display, the method comprising converting the input video signal to the output video signal using one or more transfer functions arranged to:
   remove rendering intent of the input video signal, wherein the rendering intent depends on a peak display light value for the first display and a surrounding luminance level for the first display, wherein removing rendering intent of the input video signal provides relative scene light values, or
   provide relative scene light values and apply rendering intent of the output video signal, wherein the rendering intent depends on a peak display light value for the second display and a surrounding luminance level for the second display; wherein the removing or applying rendering intent alters luminance;
   and wherein the removing or applying rendering intent is applied as a function of input RGB values according to any of:

$$R_d = L_{peak} \times R_x \times (Y_d / Y_s) \qquad (a)$$
$$G_d = L_{peak} \times G_s \times (Y_d / Y_s)$$
$$B_d = L_{peak} \times B_s \times (Y_d / Y_s)$$

$$R_s = R_r \times (Y_r)^{\frac{1-\gamma}{\gamma}} \qquad (b)$$
$$G_s = G_r \times (Y_r)^{\frac{1-\gamma}{\gamma}}$$
$$B_s = B_r \times (Y_r)^{\frac{1-\gamma}{\gamma}}$$

$$R_r = R_s \times (Y_r / Y_s) = R_s \times Y_s^{\gamma-1} \qquad (c)$$
$$G_r = G_s \times (Y_r / Y_s) = G_s \times Y_s^{\gamma-1}$$
$$B_r = B_s \times (Y_r / Y_s) = B_s \times Y_s^{\gamma-1}.$$

2. A method according to claim 1, wherein the removing or applying rendering intent is applied to a luminance component.

3. A method according to claim 1, wherein the removing or applying rendering intent is applied to RGB components without altering relative values such that color is unchanged.

4. A method according to claim 1, wherein removing or applying rendering intent alters luminance such that color is unchanged.

5. A method according to claim 1, wherein at least one of the input or output video signals is a display referred signal and the rendering intent is the rendering intent of the display referred signal.

6. A method according to claim 1, wherein the output video signal is a display referred signal and applying rendering intent comprises an opto-optical transfer function to provide the rendering intent for the display referred signal.

7. A method according to claim 1, wherein the input video signal is a display referred signal and removing rendering intent comprises an inverse opto-optical transfer function to remove the rendering intent from the display referred signal.

8. A method according to claim 1, wherein one or more transfer functions are provided by a three-dimensional (3D) look up table (LUT) having values to provide the conversion.

9. A converter for processing an input video signal intended for a first display to produce an output video signal appropriate for a second display, the converter comprising:
   a processor configured and programmed with instructions to execute one or more transfer functions that:
      provide relative scene referred signal values; and
      remove rendering intent of the input video signal, wherein the rendering intent depends on a peak display light value for the first display and a surrounding luminance level for the first display, or apply rendering intent of the output video signal, wherein the rendering intent depends on a peak display light value for the second display and a surrounding luminance level for the second display;
   wherein the removing or applying rendering intent alters luminance and is applied as a function of input RGB values according to any of:

$$R_d = L_{peak} \times R_s \times (Y_d / Y_s) \qquad (a)$$
$$G_d = L_{peak} \times G_s \times (Y_d / Y_s)$$
$$B_d = L_{peak} \times B_s \times (Y_d / Y_s)$$

$$R_s = R_r \times (Y_r)^{\frac{1-\gamma}{\gamma}} \qquad (b)$$
$$G_s = G_r \times (Y_r)^{\frac{1-\gamma}{\gamma}}$$
$$B_s = B_r \times (Y_r)^{\frac{1-\gamma}{\gamma}}$$

$$R_r = R_x \times (Y_r / Y_s) = R_s \times Y_s^{\gamma-1} \qquad (c)$$
$$G_r = G_x \times (Y_r / Y_s) = G_s \times Y_s^{\gamma-1}$$
$$B_r = B_x \times (Y_r / Y_s) = B_s \times Y_s^{\gamma-1}.$$

10. A converter according to claim 9, wherein the removing or applying rendering intent is applied to a luminance component.

11. A converter according to claim 9, wherein the removing or applying rendering intent is applied to RGB components without altering relative values such that color is unchanged.

12. A converter according to claim 9, further comprising means for scaling to convert between an absolute range and a relative range.

13. A converter according to claim 9, wherein:
   at least one of the input or output signals is a display referred signal and the rendering intent is the rendering intent of the display referred signal.

14. A converter according to claim 13 wherein the output video signal is a display referred signal and applying rendering intent comprises an opto-optical transfer function to provide the rendering intent for the display referred signal.

15. A converter according to claim 13 wherein the input video signal is a display referred signal and removing rendering intent comprises an inverse opto-optical transfer function to remove the rendering intent from the display referred signal.

16. A converter according to claim 9, wherein one or more transfer functions are provided by a three-dimensional (3D) look up table (LUT) having values to provide the conversion.

17. A device comprising the converter of claim 9.

18. A receiver, set top box or display comprising the converter of claim 9.

19. A system comprising the converter of claim 9.

20. Apparatus being part of a studio chain comprising means arranged to undertake the method of claim 1.

21. A transmitter comprising the converter of claim 9.

* * * * *